US006925486B2

(12) United States Patent
Hattori et al.

(10) Patent No.: US 6,925,486 B2
(45) Date of Patent: Aug. 2, 2005

(54) INFORMATION PROCESSING APPARATUS AND METHOD AND INFORMATION PROCESSING PROGRAM RECORDING MEDIUM

(75) Inventors: Masanori Hattori, Tokyo (JP); Yasuo Nagai, Tokyo (JP); Yutaka Irie, Kawasaki (JP); Akihiko Ohsuga, Kawasaki (JP); Shinichi Honiden, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 57 days.

(21) Appl. No.: 10/392,839

(22) Filed: Mar. 21, 2003

(65) Prior Publication Data

US 2004/0044737 A1 Mar. 4, 2004

Related U.S. Application Data

(62) Division of application No. 09/146,669, filed on Sep. 3, 1998, now Pat. No. 6,557,025.

(30) Foreign Application Priority Data

Sep. 5, 1997 (JP) ............................................. 9-241063

(51) Int. Cl.[7] ................................................ G06F 15/16
(52) U.S. Cl. ........................ 709/202; 709/223; 719/317; 714/4
(58) Field of Search ................................. 709/201–203, 709/249, 223; 706/15, 46, 49; 714/1, 4, 26; 719/316–319; 705/8, 9, 37; 718/100–108

(56) References Cited

U.S. PATENT DOCUMENTS 5,448,722 A    9/1995  Lynne et al.
5,546,594 A    8/1996  Wazumi
5,603,031 A    2/1997  White et al.
5,638,494 A    6/1997  Pinard et al.

(Continued)

FOREIGN PATENT DOCUMENTS

JP    7-6142       1/1995
JP    7-49783      2/1995
JP    7-182174     7/1995
JP    8-77090 A    3/1996

OTHER PUBLICATIONS

Collins et al., "Temporal Strategies in a Multi-Agent Contracting Protocl", Mar. 11, 1997.*
Kanachanasevee et al., "Contract-Net Based Scheduling for Holonic Manufacturing Systems".*
Beam et al., "Automated Negotiations, A Survey of the State of the ARt".*
O. Etzioni et al., "A Softbot-Based Interface to the Internet," Communications of ACM, 37(7), pp. 72–76, Jul. 1994.

(Continued)

*Primary Examiner*—William C. Vaughn, Jr.
(74) *Attorney, Agent, or Firm*—Finnegan, Henderson, Farabow, Garrett & Dunner, L.L.P.

(57) ABSTRACT

A planning means generates a plan to be executed by agents on a node. In the case where the plan generated uses an uncertain knowledge required to be processed in other nodes, a judging means judges the communication line connecting the node and a network is low or high in reliability. In the case where the reliability of the communication line is low, an agent management unit moves the agent for executing the plan to another node for processing the uncertain knowledge. In the case where the reliability of the communication line is high, on the other hand, a cooperation protocol realization means requests an agent on another node to process the uncertain knowledge. An agent execution means executes the plan generated.

9 Claims, 9 Drawing Sheets

U.S. PATENT DOCUMENTS

| | | | |
|---|---|---|---|
| 5,732,078 A | | 3/1998 | Arango |
| 5,802,280 A | | 9/1998 | Cotichini et al. |
| 5,802,396 A | * | 9/1998 | Gray ............................ 710/20 |
| 5,812,792 A | | 9/1998 | Haddock et al. |
| 5,825,759 A | * | 10/1998 | Liu ............................ 370/331 |
| 5,828,835 A | | 10/1998 | Isfeld et al. |
| 5,887,171 A | * | 3/1999 | Tada et al. .................. 719/317 |
| 5,893,083 A | | 4/1999 | Eshghi et al. |
| 5,893,098 A | | 4/1999 | Peters et al. |
| 5,925,097 A | | 7/1999 | Gopinath et al. |
| 5,944,783 A | * | 8/1999 | Nieten ........................ 709/202 |
| 6,012,152 A | | 1/2000 | Douik et al. |
| 6,029,188 A | * | 2/2000 | Uyama ........................ 718/102 |
| 6,055,240 A | | 4/2000 | Tunnicliffe |
| 6,055,562 A | * | 4/2000 | Devarakonda et al. ...... 709/202 |
| 6,065,039 A | * | 5/2000 | Paciorek ..................... 709/202 |
| 6,085,222 A | * | 7/2000 | Fujino et al. ............... 709/202 |
| 6,115,736 A | * | 9/2000 | Devarakonda et al. ...... 709/202 |
| 6,134,580 A | | 10/2000 | Tahara et al. |
| 6,134,678 A | | 10/2000 | Mahalingam et al. |
| 6,148,327 A | * | 11/2000 | Whitebread et al. ........ 709/202 |
| 6,151,309 A | * | 11/2000 | Busuioc et al. ............. 370/328 |
| 6,182,055 B1 | | 1/2001 | Kase et al. |
| 6,192,354 B1 | | 2/2001 | Bigus et al. |
| 6,199,172 B1 | | 3/2001 | Dube et al. |
| 6,212,649 B1 | | 4/2001 | Yalowitz et al. |
| 6,226,666 B1 | * | 5/2001 | Chang et al. ............... 709/202 |
| 6,237,045 B1 | * | 5/2001 | Enomoto .................... 719/328 |
| 6,285,977 B1 | * | 9/2001 | Miyazaki .................... 703/26 |
| 6,289,394 B1 | * | 9/2001 | Kozuka ...................... 719/317 |
| 6,330,586 B1 | * | 12/2001 | Yates et al. ................. 709/201 |
| 6,338,081 B1 | * | 1/2002 | Furusawa et al. ........... 709/202 |
| 6,401,080 B1 | * | 6/2002 | Bigus et al. ................. 705/37 |
| 6,557,025 B1 | * | 4/2003 | Hattori et al. .............. 709/202 |
| 6,574,607 B1 | * | 6/2003 | Carter et al. ................ 705/26 |

OTHER PUBLICATIONS

William Stallings, SNMP, SNMPv2 and RMON, Practical Network Management, Second edition, 1996.

Goro Kunito et al., "Study of Tracking Agent for A Multiple–Mobile Agent Environment," Technical Research Report (IN97–20 to 27) of the Institute of Electronics, Information and Communication Engineers, Apr. 21, 1997, vol. 97, No. 13, pp. 1–8. Abstract.

O. Etzioni et al. "A Softbot–Based Interface to the Internet", Communications of ACM, 37(7), pp. 72–76, Jul. 1994.

Masanori Hattori et al., "Plangent II: An Intelligent Network Agent System," Lecture Note/Software 17 –Foundation of Software Engineering III, 1$^{st}$ edition, published by Kindaikagakusha, Dec. 20, 1996, pp. 194–197.

Goro Kunito et al., "A Study of Tracking Agent for a Multiple–Mobile Agent Environment," Technical Research Report (IN97–20 to 27) of the Institute of Electronics, Information and Communication Engineers, Apr. 21, 1997, vol. 97, No. 13, pp. 1–8.

William Stallings, SNMP,v2 and RMON, Practical Network Management, Second edition, 1996.

* cited by examiner

INFORMATION PROCESSING APPARATUS AND METHOD AND INFORMATION PROCESSING PROGRAM RECORDING MEDIUM

This is a division of application Ser. No. 09/146,669 filed Sep. 3, 1998, now U.S. Pat. No. 6,557,025, which is incorporated herein by reference.

BACKGROUND OF THE INVENTION

The present invention relates to an improvement in the technique by which a plurality of agents process the information distributed over a network, or more in particular to an improved information processing system and method and an improved information processing program recording medium operable in stable fashion even in an unstable environment of the network line or the like.

The tendency of the day is toward an information processing system constructing a basis of computers distributed on a network as a result of the progress of down-sizing and the improved network environment due to the extension of the Internet.

A network connected to a wide area network such as the Internet is called an open network. This open network is accompanied by a more and more open environment. With the advance of an open environment, the various data and functions existing on the network come to have a close relationship with an external wide area network. The resulting interaction with the external wide area network increases the chance of affecting or changing the various data and functions existing on the network.

In this open network environment, requests sent as messages and commands to the software or the software construction may undergo a change in a form not expected in advance.

A request to the software, for example, may change to the one taking the acquisition of a specific file from an external wide area network as granted. Also, a file for realizing a specific function may be moved to a server having a sufficient security against external intrusion.

Demand is growing for a flexible software construction which is adaptive to such a change without any labor of the user or downtime of the system in operation. Such a flexible software construction can provide the user with a more flexible and stable information service in an open environment.

An agent-oriented technique has come to be closely watched recently as a technique for realizing such a flexible software construction. The agent-oriented technique is for constructing a system using software units called agents, which autonomously act in response to the change of their environment. Many attempts have been made on agents capable of meeting an environmental change flexibly by autonomous operation in an open network.

For example, Jpn. Pat. Appln. KOKAI Publication No. 7-182174 discloses a method of executing a remote programming by which agents are transferred between nodes in a distributed computer system. FIG. 10 shows an example configuration of a system for executing a remote programming. In this case, an agent is realized as a process on a node, and the process, i.e. the operation of the agent is assigned beforehand by a program called "plan".

The plan is described in a series of instructions describing the operation of the agent process. A unit of the plan constitutes "instruction". Also, the node on which an agent originally exists is called "local node", the node to which the agent is moved is called "remote node". Both are shown in FIG. 10 by reference numerals 800L and 800R, respectively.

The processing for moving an agent to another node is designated by a special type of instruction (hereinafter referred to as "go-operation") described in the plan. A specific application of the go-operation will be described. Assume, for example, that an instruction to search by the local node 800L for a specific file is described in the plan and that the search has failed. As a resulting operation, the go-operation for moving the agent to the remote node 800R and the instruction to search by the remote node 800R for the same file again after move are described in the plan.

In this case, the plan is first executed at the local node 800L. The plan to be executed is stored in advance in the agent information storage means 801L. The internal state for agent activity, i.e. a work area is stored with the plan in the agent information storage means 801L as agent information.

As the agent begins to act at the local node 800L, the interpretation/execution means 802L interprets and executes the instructions in the plan sequentially while at the same time updating the internal state of the agent. Upon failure to discover the file while executing the plan at the local node 800L, the interpretation/execution means 802L interprets and executes the instruction in the plan and the go-operation. In the interpretation and execution of the go-operation, the agent management means 804L transfers the agent in the way described below.

Specifically, the agent management means 804L first communicates with the agent management means 804R on the remote node 800R through the network 800N. In this communication, the contents of the plan and the internal state of the agent as of the interpretation and execution of the go-operation are transferred to the remote node 800R. These information, which are transferred to the remote node 800R, are stored in the agent information storage means 801R by the agent management means 804R. The agent management means 804R then activates the interpretation/execution means 802R thereby to continue the interpretation and execution of the instruction. As a result, the operation of the agent similar to that performed in the local node 800L from which it came continues to be performed in the remote node 800R.

As described above, according to Jpn. Pat. Appln. KOKAI Publication No. 7-182174, a flexible action is possible against any change of the situation in which the file to be discovered is moved from a local node to a remote node. In this prior art, even between nodes having different operating systems or different hardware, an agent can be moved between the nodes and the plan can be continued as long as the grammar used for the plan and the format of expressing the internal state of the agent are unified.

Etzioni, et al. discloses an information processing method (reference: Oren Etzioni and Daniel Weld "A Softbot-Based Interface to the Internet" (Communications of ACM), in which the ordinary network functions such as ftp and telnet are used and dynamically selected while being flexibly backtracked based on the information collected during the operation. The backtracking is defined as the use of various functions on trial and error basis. This information processing method permits a flexible operation against the state, of the system at each time point. This flexible operation is realized by the technique called the planning.

Also, Jpn. Pat. Appln. KOKAI Publication No. 7-6142 and Jpn. Pat. Appln. KOKAI Publication No. 8-77090 disclose a multiagent cooperation system and a method thereof. In the multiagent cooperation system, a plurality of agents each have the function of exchanging information with other agents thereby to realize the cooperation between the agents for flexible and efficient information processing.

This prior art, however, has the following problem.

In the method of executing a remote programming disclosed in Jpn. Pat. Appln. KOKAI Publication No. 7-182174, the plan defining the operation of an agent is required to be described beforehand in its entirety by the user using instructions. Especially, in the go-operation for moving an agent, the destination node for the agent is required to be designated by an identifier for the network. The destination node for the agent is the one to which the agent is moved and the identifier is expressed by a node name or the like.

In an open network, however, the information on each node constituting the network such as the node name undergoes a constant change and it is difficult to keep monitoring such a change from time to time.

For this change to be met, a troublesome operation is required not only to monitor the change of the destination node name in advance but also to change the instruction according to the change. The technique disclosed in Jpn. Pat. Appln. KOKAI Publication No. 7-182174, therefore, has its own limit in meeting the change of the open network flexibly.

The information processing method proposed by Etzioni, et al. on the other hand, utilizes the normal network functions such as ftp and telnet as a means for using the network. The mere use of these communication protocols, however, still makes it difficult to access the information at a remote node smoothly. For ftp and telnet, for example, an inter-node communication route is required to be stably maintained both physically and logically from the start to end of a series of data exchange. In the case where a route through which information is being accessed through the network is temporarily cut off, the access becomes impossible or the authentication or file access must be resumed from the beginning.

Further, the multiagent techniques disclosed in Jpn. Pat. Appln. KOKAI Publication No. 7-6142 and Jpn. Pat. Appln. KOKAI Publication No. 8-77090 have the following problems. The first problem is a low line reliability. Specifically, the feature of an open network is that it is configured of various types of machines (computers) and connection lines. With the recent extension of what is called the mobile computing, portable terminals have come to be used widely. The portable terminal is a small computer freely portable by the user and often is connected to a network through a radio channel such as a portable telephone or a PHS terminal. The portable terminal is used at the risk of communication failure by the battery being consumed up during communication. These limitations due to the power supply and the radio connection make the portable terminal a node having a line low in reliability for connection with the network.

The conventional multiagent techniques disclosed in Jpn. Pat. Appln. KOKAI Publication No. 7-6142 and Jpn. Pat. Appln. KOKAI Publication No. 8-77090, however, presuppose the capability of frequent communication between agents using a highly reliable communication line, and therefore cannot fully exhibit the performance thereof with the above-mentioned line of low reliability. Thus, an information processing technique has been-sought for which can stably operate even on a line low in reliability.

The second problem point of the above-mentioned multiagent techniques is the environmental stability.

Specifically, the conventional multiagent techniques are configured on condition that the environment such as the specifics of knowledge remain stable and are not unduly changed at least as long as a series of cooperation steps is proceeding. The conventional multiagent techniques, therefore, cannot exhibit a full function in an environment such as an open network in which an unexpected change is liable to occur frequently. As a result, an information processing technique is required which operates in stable fashion against any changes of the situation.

Further, in the conventional multiagent techniques, the communication between any agents is processed equally regardless of the contents thereof. In view of the difference in the order of priority depending on the agents engaged in communication and the contents of the communication, however, communication means are desirably provided in which inter-agent communications are differently handled according to the order of priority in order to flexibly control the cooperation between agents.

BRIEF SUMMARY OF THE INVENTION

The present invention has been developed in order to meet the above-mentioned situation, and an object thereof is to provide an information processing technique which assures stable operation even against an unstable environment or line by making available a variety of the manners in which an agent operates.

Another object of the invention is to provide an information processing technique capable of flexible cooperation between agents by enlarging the communication means between the agents.

One aspect of the present invention, there is provided an information processing apparatus comprising: means for inputting a request; means for generating an agent corresponding to the request inputted from the input means; planning means for generating a plan which satisfies the request; means for determining a reliability of a communication line in the case where an uncertain knowledge is used for generation of the plan by the planning means; selecting means for selecting one of a processing of a movement of the agent and a processing of a contract net protocol in accordance with the reliability; uncertain knowledge processing means for processing the uncertain knowledge on the basis of the processing selected by the selecting means; and executing means for executing the plan after the uncertain knowledge processing means processes the uncertain knowledge.

Another aspect of the present invention, there is provided an agent processing system for processing agents, comprising: a network; and a plurality of nodes interconnected via the network, the plurality of nodes being each capable of becoming a remote node or a local node with respect to other nodes, the remote node and/or the local node comprising: means for inputting a request; means for generating an agent corresponding to the request inputted from the input means; planning means for generating a plan which satisfies the request; means for determining a reliability of a communication line in the case where an uncertain knowledge is used for generation of the plan by the planning means; selecting means for selecting one of a processing of a movement of the agent and a processing of a contract net protocol in accordance with the reliability; uncertain knowledge processing means for processing the uncertain knowledge on the basis of the processing selected by the selecting means; and executing means for executing the plan after the uncertain knowledge processing means processes the uncertain knowledge.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the information processing system according to this invention will be explained below with reference to the accompanying drawings.

1. Configuration

Figure 1:
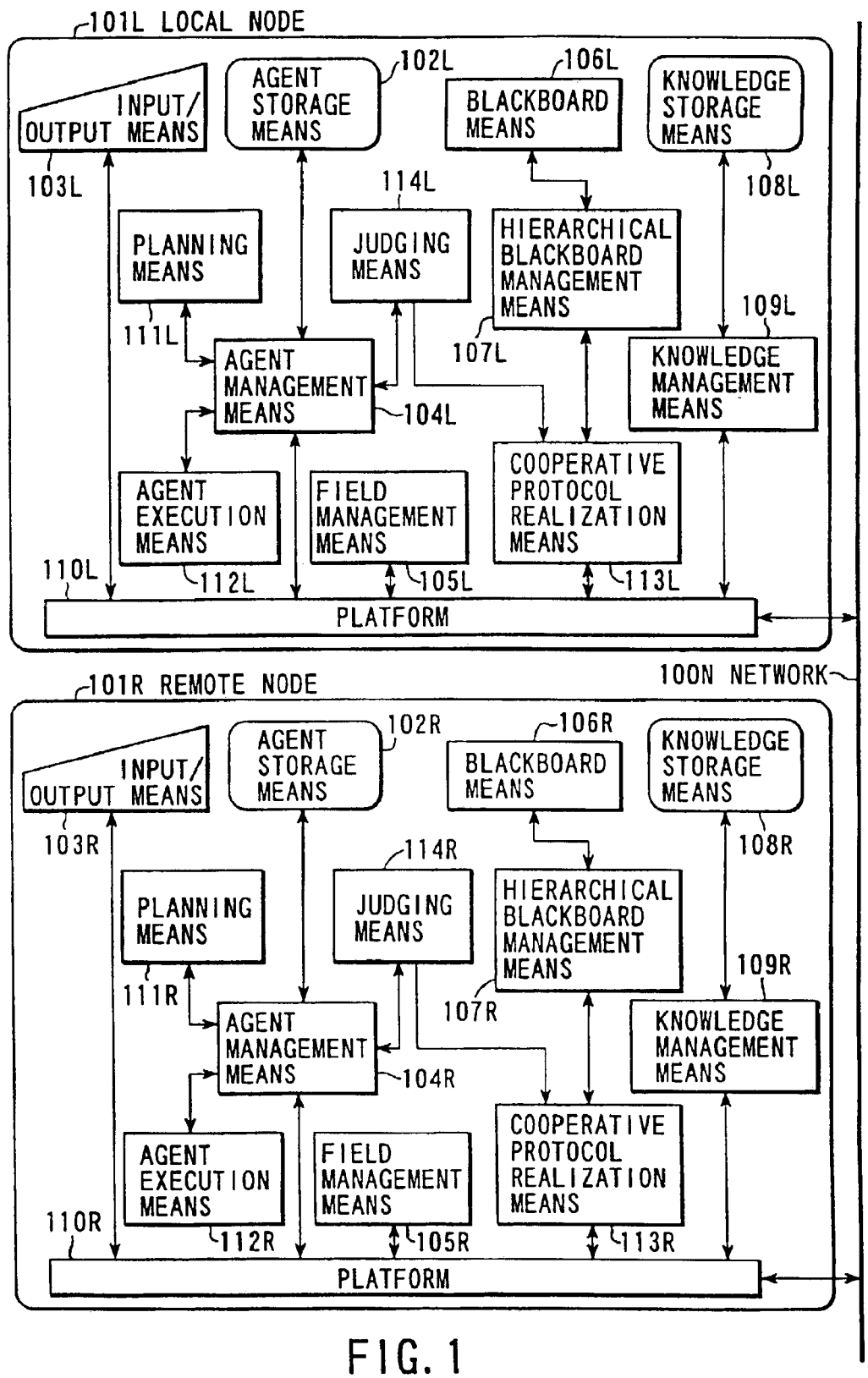
FIG. 1 is a block diagram showing a general configuration of a software agent system according to an embodiment of the present invention.

FIG. 1 is a block diagram showing a general configuration of a software agent system according to an embodiment of the invention. The software agent system (hereinafter referred to as "the system") comprises a plurality of nodes connected through a network. The system shown in FIG. 1, for example, comprises two nodes, i.e. a local node 101L and a remote node 101R connected by a network 100N.

In terms of a plan for determining the operation of an agent, the node that has generated the plan is called a local node, and the node to which the processing based on the particular plan is requested or the agent is moved is called a remote node.

The local node 101L and the remote node 101R have a similar configuration. Therefore, in the description that follows, the reference numerals of elements of a node have a suffix "L" for the local node 101L and a suffix "R" for the remote node 101R to distinguish between the remote and local nodes from each other, as seen from such an expression as "The local node 101L has input/output means 103L, and the remote node 101R has input/output means 103R".

In the case where the two types of nodes are called collectively, on the other hand, the same elements of the two nodes are designated free of the letter "L" and "R" such as input/output means 103.

[1-1 Configuration for Generation and Execution of a Plan]

As shown in FIG. 1, the node 101 includes means for realizing the activity of the agent, comprising agent management means 104, planning means 111, agent storage means 102 and agent execution means 112.

The agent management means 104 is a part for generating and managing an agent and extinguishing the agent that has achieved the function thereof. The planning means 111 is a part for generating a plan to be executed by the agent for achieving an object assigned.

The agent storage means 102 is a part for storing and supplying data such as a plan and a work area for the agent. The agent execution means 112 is for realizing the operation of the agent by executing the plan generated by the planning means 111.

The node 101 also includes input/output means 103, which is a part for inputting commands or the like information for controlling the status of the node and each means and inputting/outputting other information.

The node 101 further includes knowledge storage means 108 for storing information used to generate a plan and knowledge management means 109. The knowledge storage means 108 is a part for storing the knowledge such as a procedure and data used for forming a plan, such as information on various operations used as a unit of the planning or information on the file location and the functions of each node determined on the network are stored previously. Also, in the case where a file is liable to be moved to other nodes or the situation is liable to change otherwise, the knowledge of the facts that may change is stored in the knowledge management means 109 in the form of an uncertain knowledge. The knowledge management means is a part for 109 managing the knowledge stored in the knowledge storage means 108 and inputting/outputting the required knowledge.

[1-2 Configuration for Information Exchange Between Agents]

Figure 2:
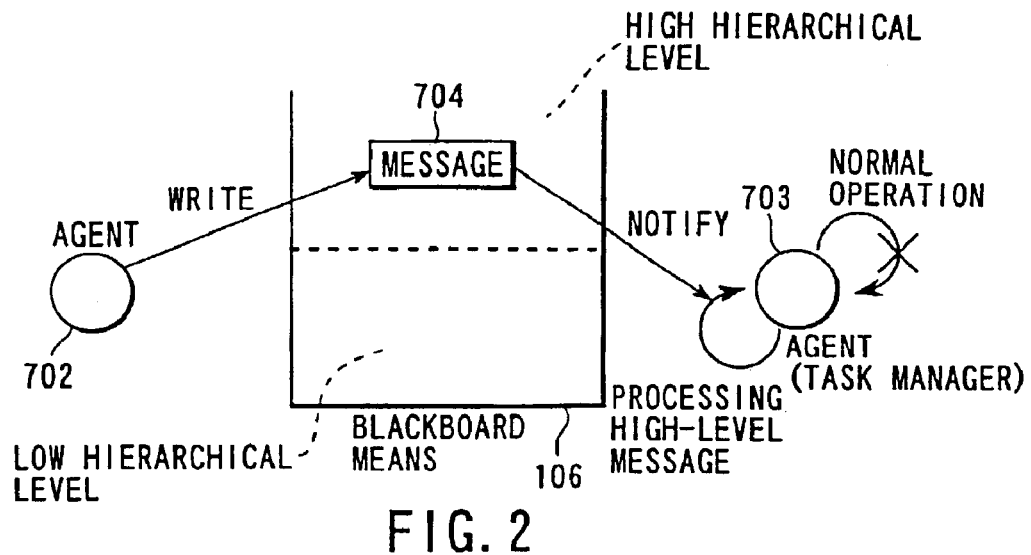
FIG. 2 is a schematic diagram showing a structure of blackboard means according to an embodiment of the invention.

The node 101 includes blackboard means 106, hierarchical blackboard management means 107 and cooperative protocol realization means 113 for realizing the cooperation between agents. The blackboard means 106 is a storage unit playing the role of a message board in which information to be exchanged between agents is written. The black board means 106 has a plurality of hierarchical levels corresponding to the priority of information. The hierarchical blackboard management means 107, on the other hand, is a part for inputting/outputting the information exchanged between agents to and from the blackboard means 106. FIG. 2 is a schematic diagram showing the relation between the hierarchy of the blackboard means 106 and the agents.

All the agents are generated as an entity corresponding to any one of hierarchical levels of the blackboard means 106. Specifically, different numerals are assigned to different hierarchical levels, and the agents generated are assigned these numerals as an order of priority. In the example of FIG. 2, the agents 702 and 703 are assumed to correspond to low hierarchical levels of the blackboard. In this case, the agent 702 attempting to send information to the agent 703 normally writes the information in the low hierarchical level. Especially important information, however is written in a hierarchical level higher than a corresponding low hierarchical level.

The hierarchical blackboard management means 107 processes the information written in a high hierarchical level of the blackboard means 106 in priority over the information written in a low hierarchical level (hereinafter the information is referred to as "a high-level message"). An example of priority processing is that the normal operation performed by an agent to which information is addressed is suspended by an interruption to process a high-level message. The cooperative protocol realization means 113, on the other hand, is a part for realizing a cooperative protocol between agents based on the information exchanged through the hierarchical blackboard management means 107.

[1-3 Configuration for the Processing Required for Uncertain Knowledge]

A plan that has been generated may include an uncertain knowledge. The uncertain knowledge is the one on which some processing is required to be executed by other nodes. According to this embodiment, the processing of a plan generated based on such an uncertain knowledge is executed in two types of techniques including a request to one or a plurality of agents at other nodes and movement to other nodes. It should be noted that the agent at the requester (node) is extinguished. The processing according to this method requires the following configuration of the system.

Specifically, the node 101 includes judging means 114 for determining which type of technique is to be used. The judging means 114 judges whether the reliability of the communication line connecting the node that has generated the plan and the network to each other is high or low in the case of the generated plan uses the uncertain knowledge. In movement of the agent, in the case where the reliability of the communication line is low, the agent is moved to another agent, whereas in the case where the reliability is high, a request is issued to another agent.

In the case where the judging means 114 judges that the reliability of the line is low, the agent management means 104 doubles as movement means for moving the agent corresponding to the plan to another node. Also, the agent management means 104 of each node 101 is configured to receive the agent moved thereto from another node for processing of the uncertain knowledge.

On the other hand, the request to other agents for processing on the uncertain knowledge is realized by the cooperative protocol realization means 113 used for the cooperation between agents in general. Specifically, the cooperative protocol realization means 113 is so configured as to request other agents of other nodes for the processing on the uncertain knowledge in the case where the judging means 114 judges that the reliability of the line is high. The cooperative protocol realization means 113 of each node 101 is also configured to perform the processing for accepting such a request.

The cooperative protocol realization means 113 is configured to use a contract net protocol as a cooperative protocol for the request. In the contract net protocol, the processing requested by the requesting agent is publicly announced, each agent having the intention of accepting the request submits a tender and the successful bidder is requested to execute the processing.

[1-4 Configuration for Field]

Also, in order to facilitate the management of the knowledge required for planning, this system employs the concept of the field providing a unit of classification of knowledge for each node. Specifically, the node 101 has field management means 105 for improving the efficiency of information processing. The field management means 105 is a part for dividing and managing an area such as a memory space for agent activity into a plurality of fields according to the object involved. Also, the field management means 105 is configured to divide and manage the knowledge used for generating a plan into units corresponding each field. Further, the field management means 105 is configured so that each field and knowledge thus divided is used by an agent having a corresponding object.

Figure 3:
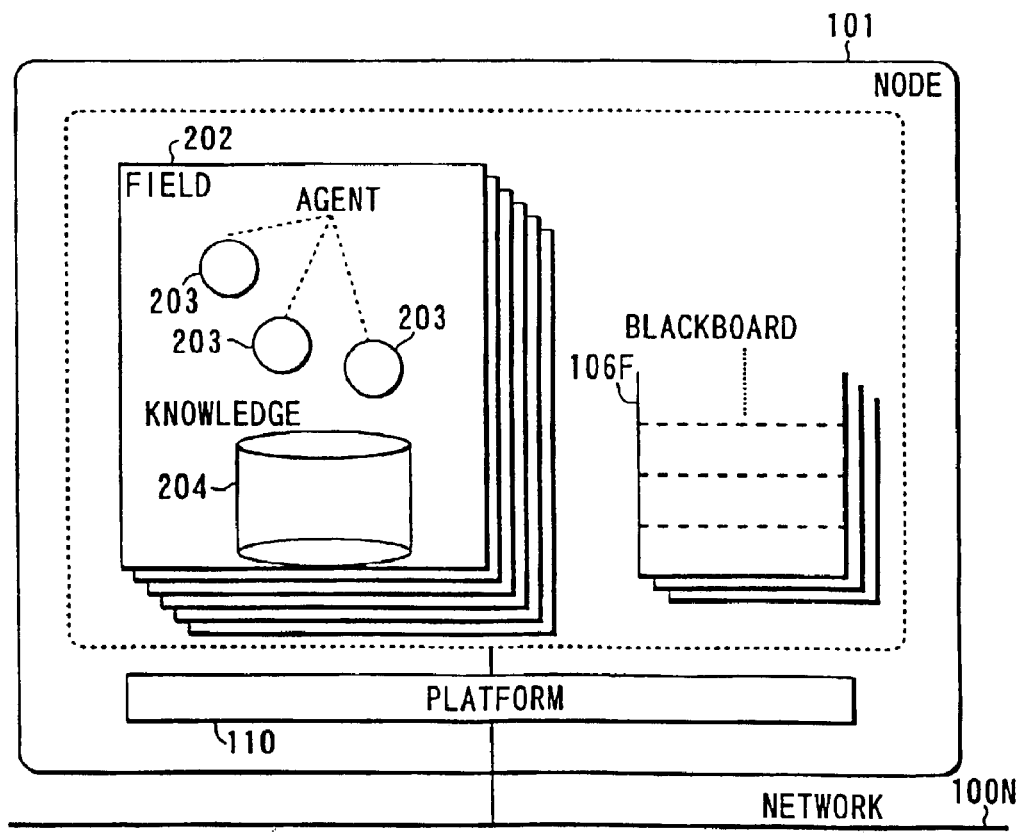
FIG. 3 is a schematic diagram showing the relation between agents, a node and fields according to an embodiment of the invention.

FIG. 3 is a schematic diagram showing the relation between the agent, the node and the field according to this embodiment. Specifically, the node 101 connected to a network 100N is a conceptual unit, and specifically has an assortment of elements ranging from the agent storage means 102 to the judging means 114 shown in FIG. 1. Therefore, the node is not necessarily a single computer or a single CPU as hardware. For example, only one node can exist on one computer connected to the network, or a plurality of nodes can be configured using a multiprocess system. Conversely, a plurality of CPUs on a plurality of computers can execute the distributed processing to realize the function of a node.

On each node, the area for agent activity and the knowledge for plan generation are divided into a plurality of fields. Different "fields" are set with different objects. The "object" used herein can be determined freely. For example, the "object" can be varied from one knowledge field to another, or between on-line processing and batch processing.

FIG. 3 shows the state in which a plurality of fields 202 exist on a single node 101 and one or a plurality of agents 203 exist and act in a field. Also, the knowledge in the knowledge storage means 108 as shown in FIG. 1 is divided by field. In FIG. 3, the divided knowledge 204 corresponds to a given field 202. The other portions of the knowledge correspond to the other fields, respectively. These fields and the divided knowledge are managed by the field management means 105. Also, as shown in FIG. 3, a plurality of corresponding blackboards 106F can be provided for the fields.

[1-5 Configuration for Other Parts]

The node 101 has a platform 110 for supporting the operation of each of the above-mentioned means. The platform 110, which is a basic software part for realizing the node operation, manages and assigns the resources in the node, performs the basic input/output operation, manages and controls each of the above-mentioned means, and manages the communication with other nodes.

In order to enable the system to sufficiently and readily exhibit the functions thereof, a uniform data format configured of a dedicated descriptive language is used for the information in the system as applied to the case in which the user describes a request as an object of information processing, the case in which the knowledge for planning is inputted to the system in advance, the case in which the information written on the blackboard 106 for exchange between agents is expressed, etc.

2. Operation and Effects

In this embodiment having the above-mentioned configuration, the following information processing is executed. This processing is realized by the platform 110 which controls each means in the node 101. Also, the processing based on the field is performed through the field management means 105 each time.

[2-1 Request Input]

Figure 4:
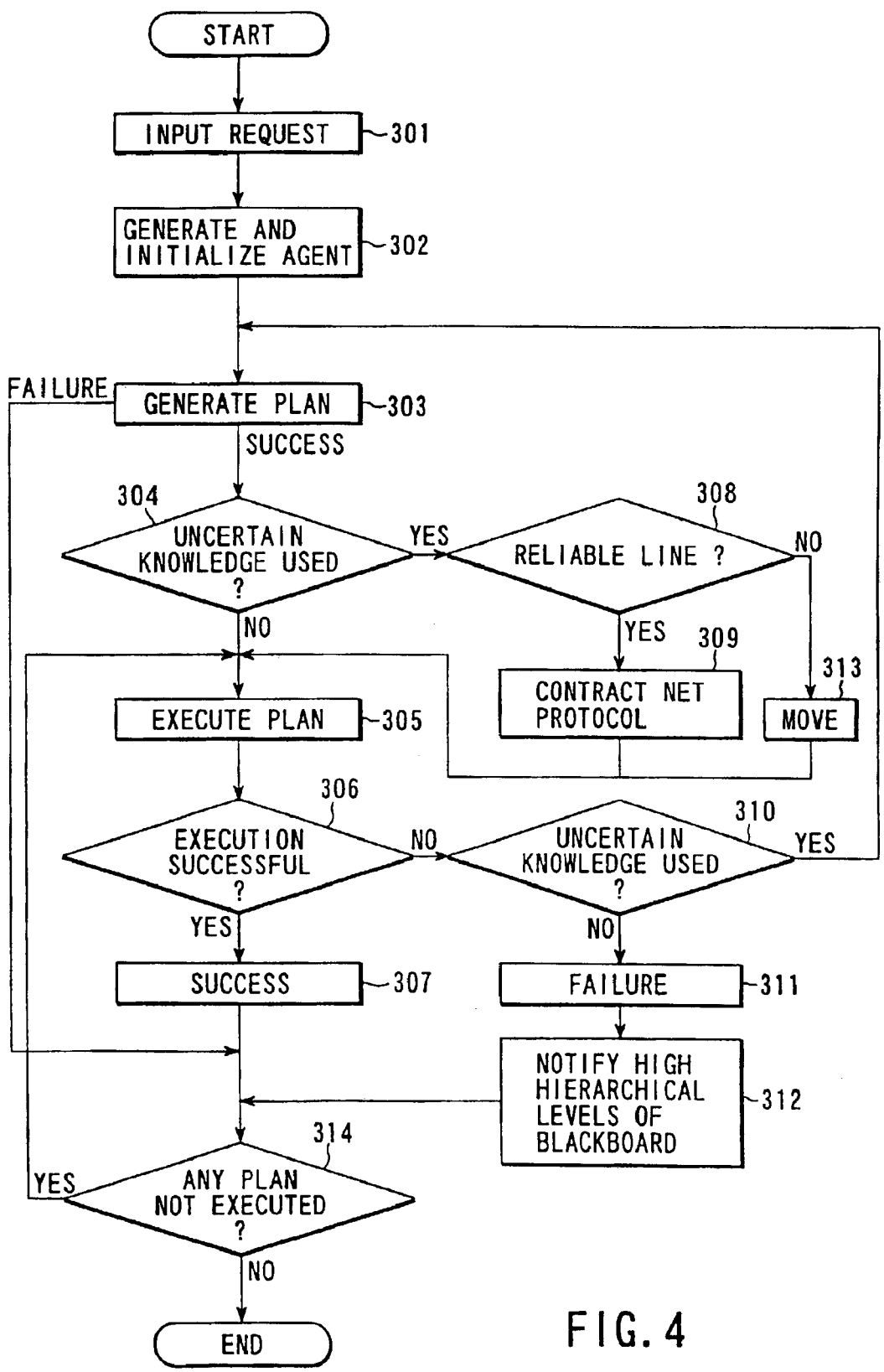
FIG. 4 is a flowchart showing the operation of a software agent system according to an embodiment of the invention.

First, refer to FIG. 4 which is a flowchart showing a procedure for information processing according to this embodiment. In the case where the system is caused to perform the information processing, as shown in this diagram, the first step taken by the user is to input a request to the system by way of the input/output means 103L of the local node 101L (step 301). The request is indicated in a predetermined format of description of the state desired as a result of the information processing. Assume, for example, that the following requests are inputted for a software component existing on the network.

installed ("compo1")
installed ("compo2")

These requests mean, top down, "the state in which the component "compo1" is installed (built in the system)" and "the state in which the component "compo2" is installed". The request indicated by these two lines is to install the components "compo1" and "compo2". The component is defined as a file that performs a predetermined function.

[2-2 Generation of Agent]

Upon application of a request thereto, the agent management means 104L generates a new agent in an appropriate field and executes the initialization procedure (step 302). In the case where the agent is generated in the name of "user", for example, the initialization procedure includes registering the name "user" in the list for managing the agents, setting a predetermined initial value as an interval variable of the agent "user" and assigning a time slice (CPU time) of a time sharing system to the agent "user".

In a node having a plurality of fields like the present system (FIG. 3), each agent is generated in a specific field under the control of the agent management means 104. In the following planning step of the planning means 111, the knowledge management means 109 reads and provides a knowledge corresponding to the field. In the case of cooperation with other agents, information is exchanged with other agents through the blackboard 106F corresponding to the field.

[2-3 Planning]

Upon generation of an agent, the planning means 111L executes the planning, i.e. generates a plan with the above-mentioned incoming request as a goal (step 303). The "goal" is the state to be attained by the information processing and a concept indicating an intermediate as well as the final state. Also, the "planning" is defined as a process for generating a plan to achieve a goal. The "plan", on the other hand, is a train of instructions designating a series of behaviors to be performed by an agent for achieving the goal.

The planning is effected by combining a plurality of operations each constituting a unit. The operation constituting a unit is the one executable by the agent execution means 112. For each of these operations, a precondition and a postcondition are defined and stored in the knowledge management means 109. The precondition is the state constituting a prerequisite for a particular operation. The precondition for the operation "copy a given file", for example, is the state that "the particular file exists". The postcondition is the state generated by the particular operation. The postcondition for the operation "copy a given file", for example, is the state that "a copy of the file exists".

In the planning, the process is repeated to discover an operation to produce the state of the goal providing the final object as a postcondition and further an operation to produce the precondition for the operation thus discovered. This process is for tracing an operation sequence inversely from the last goal to the present state. In the case where the end of the operation sequence reaches a time point where the process is started, i.e. any existent present state, it follows that a plan is completed in the form of a train of operations from the present state to the final object.

Figure 5:
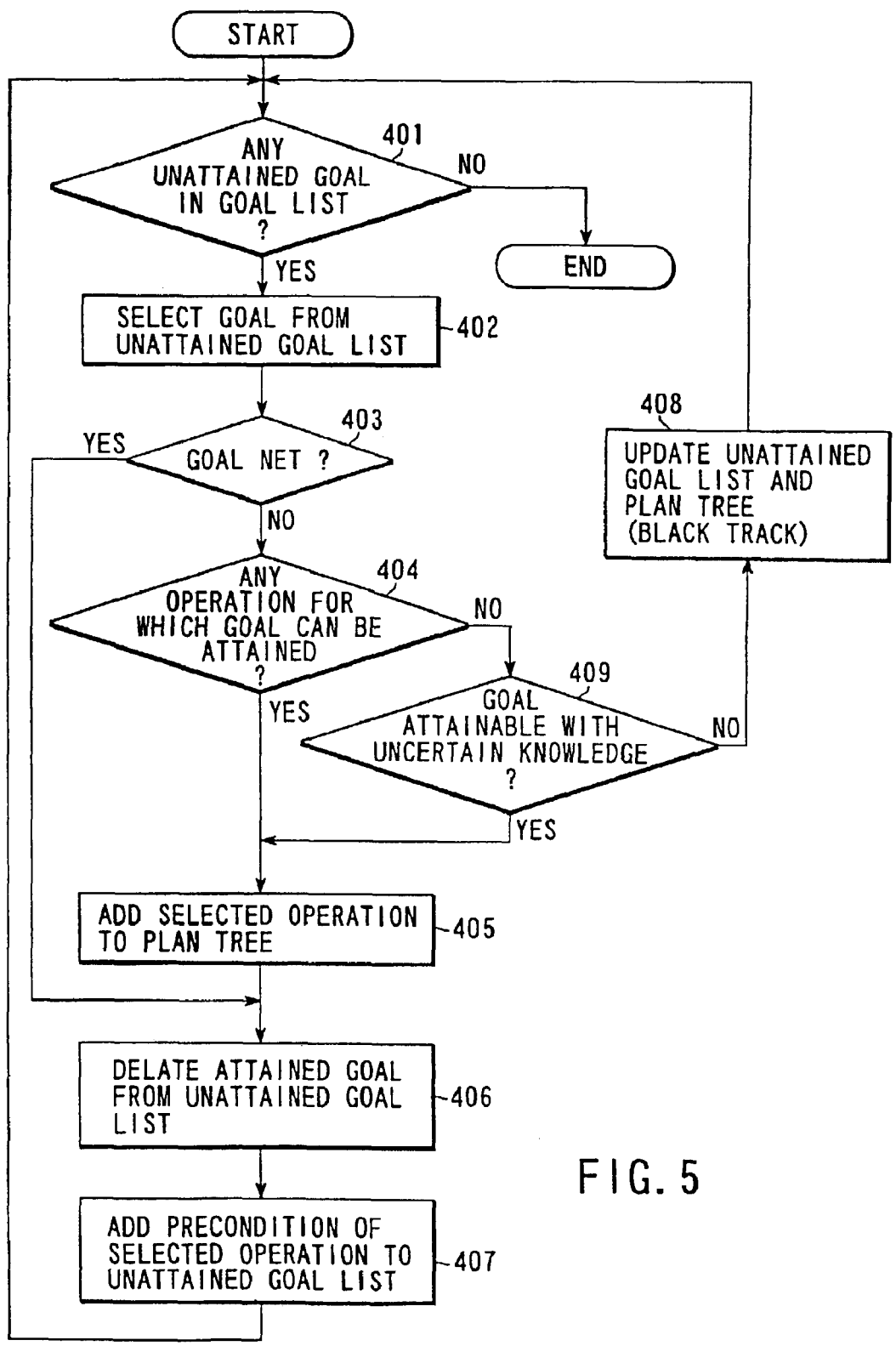
FIG. 5 is a flowchart showing the operation for generating a plan according to an embodiment of the invention.

This planning procedure is shown specifically in the flowchart of FIG. 5. This procedure uses a goal list and an unattained goal list as a work area. The goal list is for holding the final and intermediate goals included in the plan. The unattained goal list, on the other hand, is for holding the goals which are not yet to be attained at the present time and which an operation is not yet to be discovered to produce as a postcondition. The final goal is normally the description of the request issued by the user, and an intermediate goal between the final goal and the present state is called a subgoal.

Figure 6:
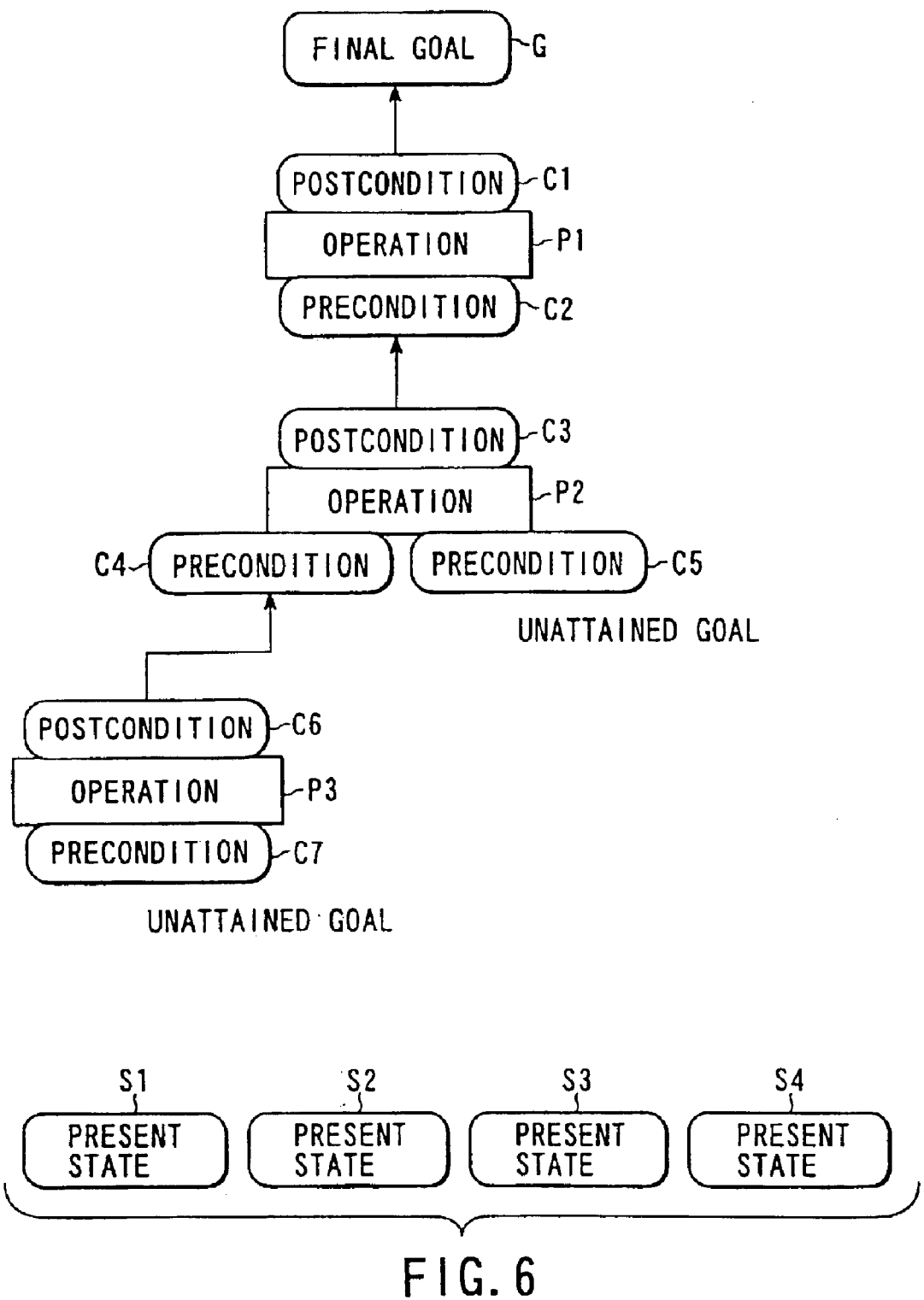
FIG. 6 is a schematic diagram showing a plan being generated according to an embodiment of the invention.

In a plan for achieving a final object, a plurality of unattained goals may occur. This is by reason of the fact that the operation of producing a given state as a postcondition may required a plurality of preconditions. FIG. 6 is a diagram showing an example of a plan being generated. In this diagram, the operation P1 for producing a final goal G constituting a given request under a postcondition C1 is already discovered. In similar fashion, the operation P2 for producing a precondition C2 of the operation P1 as a postcondition C3 is already discovered. In this case, the precondition C2 of the operation P1 and the postcondition C3 of the operation P2 are associated with different operations and are different presence, respectively. Nevertheless, the contents of the precondition and the postcondition are coincident with each other. Further, the operation P2 has two preconditions C4, C5. The operation P3 for producing the precondition C4 is already discovered according to the postcondition C6. Under this situation, the precondition C5 of the operation P2 and the precondition C7 of the operation P3 are registered in the unattained goal list. For the plan being generated, the conditions are not complete, i.e. the present states have not yet reached for starting the execution of the plan. In this case, the planning route branches. The plan is completed only when the forward ends of all the branches into which the planning is divided reach any one of the present states S1 to S4.

The knowledge management means 109 has stored therein the uncertain knowledge in addition to the above-mentioned procedure for the planning and the operations constituting units of the plan. The uncertain knowledge, as described above, is the one which requires some processing at a node other than the node of the planning and in which a specified file may exist in a specified node, for example, but the fact whether it may have been moved to another node can be confirmed only by actual access thereto.

In the procedure for the planning shown in FIG. 5, the above-mentioned request is added to the goal list as a goal. Also, this goal, which is not attained, is added to the unattained goal list. Each goal list is checked to see whether an unattained goal exists therein or not (step 401). If an unattained goal exists (YES), the plan is not yet completed, and therefore a goal is selected from the unattained goal list (step 402). Then, an inquiry is issued to the knowledge management means 109L as to whether or not the particular goal has already been met (step 403). If the result of inquiry shows that the particular goal has already been met (YES), the process proceeds to step 406. Otherwise (NO), the process proceeds to step 404.

In the case where the goal has yet to be met, an inquiry is issued to the knowledge management means 109L as to whether an operation exists to satisfy the goal selected at step 402 (step 404). The knowledge management means 109L that has received the inquiry, in order to improve the possibility of successful execution of the plan, first searches for the data on an operation other than the uncertain knowledge in priority. In the presence of an operation satisfying the goal in the knowledge (YES), the knowledge management means 109L adds the discovered operation to the plan tree (step 405). The "plan tree" is a tree structured data representing the contents of the plan and, as shown in FIG. 6, can indicate branches of the plan based on a plurality of operations having preconditions.

In the case where there is no operation having achieved the goal in step 404 (NO), an inquiry is issued to the knowledge management means 109L, as the next best measure, to see whether the goal can be met by the uncertain knowledge (step 409). The uncertain knowledge meeting the goal, if discovered (YES), is added to the plan tree in step 405. The operation or the uncertain knowledge thus added to the plan tree is hereinafter referred to as the "selected operation".

In the case where the goal is met in step 403 or the operation discovered in step 404 or the uncertain knowledge discovered in step 409 is added to the plan tree (Step 405), the presently selected goal has been achieved as far as the plan generation is concerned. As a result, the goal achieved is deleted from the unattained goal list (step 406). In the case where the selected operation is added to the plan tree in step 405, on the other hand, the precondition of the selected operation thus added is added to the unattained goal list as a new unattained goal (step 407), and the planning procedure is repeated from step 401.

The plan cannot be completed, however, in the case where an inquiry of the knowledge management means 109L in step 409 shows that the goal cannot be achieved using the uncertain knowledge. In such a case, the unattained goal list and the plan tree are restored back to the time point of processing some previous selected operation (step 408), and the planning procedure is followed again from step 401. The process of restoring the unattained goal list and the plan tree to a past time point in this way is called the back track.

For this back track in reverse direction is to be made possible, the history of updating is recorded each time the unattained goal list and the plan tree are updated in forward direction. By doing so, the unattained goal list and the plan tree can be restored to the past state by executing the contents of the history in reverse direction.

Figure 7:
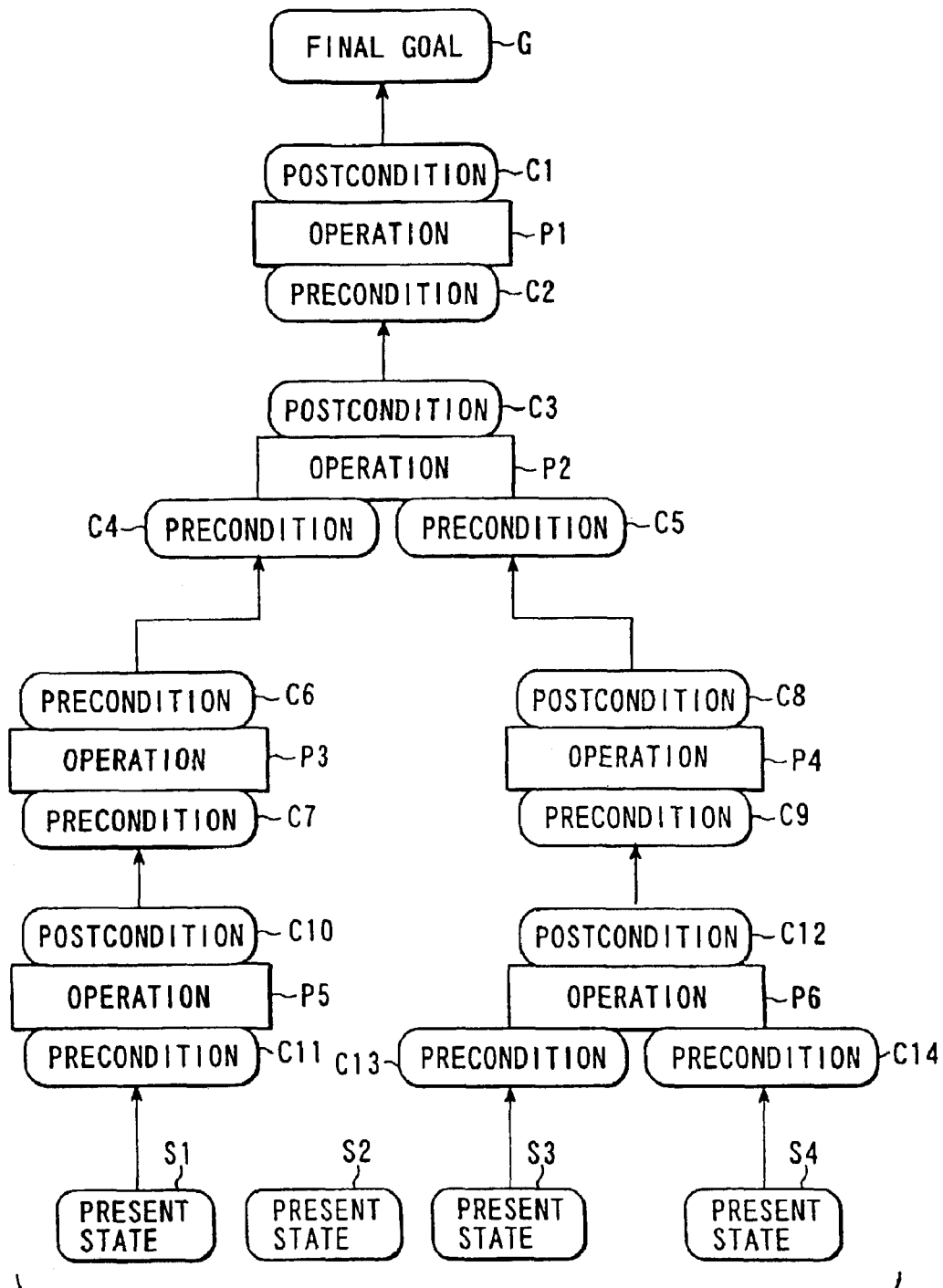
FIG. 7 is a schematic diagram showing a plan generated according to an embodiment of the invention.

As a result of executing the series of steps 401 to 407, assume that the unattained goal list is vacant (step 401). Then, it follows that the plan is completed. The planning thus is terminated. An example of the plan of FIG. 6 completed is shown in FIG. 7. As compared with the state of FIG. 6, FIG. 7 shows that since the operations P4, P5, P6 are further discovered, all the preconditions C11, C13, C14 required to exist when starting the execution of the plan are met by the present states S1, S3, S4, respectively.

[2-4 Judgment About Uncertain Knowledge and Communication Line Reliability]

Upon completion of the above-mentioned planning procedure (FIG. 4, step 303), the judging means 114L makes judgment on the uncertain knowledge (steps 304, 308). First, the judging means 114L determines whether the planning has used the uncertain knowledge or not (step 304). Whether or not the uncertain knowledge has been used can be determined based on the data recorded each time the uncertain knowledge is used in the planning or according to whether or not the plan generated and searched again contains the uncertain knowledge. In the case where the uncertain knowledge is not used in the plan, the agent execution means 112L immediately executes the plan (step 305), and upon successful execution (step 306), reports the fact to the user (step 307), thus completing the whole procedure.

In the case where the uncertain knowledge is used in the plan, on the other hand, the processing for the uncertain knowledge is required if the goal is to be achieved according to the plan. The process for the uncertain knowledge is the one executed by other nodes for verifying that the fact described in the uncertain knowledge is true. This processing is executed before execution of the plan in step 305.

The judging means 114L judges whether the reliability of the line connecting the node which has produced the plan to the network is high or low (step 308). This judgment can be made either by accumulating the data representing the network configuration and reading out the type of the line from the data or by storing the history of communication errors and linking failures occurred in the node sequentially and calculating the reliability from the history within a certain time length of the past.

In the case where a line connecting the nodes is a radio channel of a portable terminal or otherwise low in reliability, the process for uncertain knowledge is executed by moving the agent to a node capable of processing based on the uncertain knowledge (step 313), and then the plan is executed (step 305). In the case where the line connecting the nodes is high in reliability, on the other hand, the procedure for the contract net protocol is executed (step 309). In this way, the processing for the uncertain knowledge is requested to agents of other nodes for achieving the goal by executing the plan.

Assume, for example, that the operation "install ("compo1")" is obtained from the knowledge management means 109L as an operation that satisfies the request "installed ("compo1")" in the planning. Also for the precondition "exists ("compo1")" of "install ("compo1")", assume that the operation "get ("compo1" from Node)" is obtained by a similar processing. Further, assume that as a result of continuing the plan production for the precondition "exists ("compo1") at Node" of "get ("compo1" from Node)", it is found that this precondition is satisfied only by the following uncertain knowledge.

maybe (exists ("compo1") at node2)
    maybe (exists ("compo1") at node3)
    maybe (exists ("compo1") at node4)

In this case, a plan including these uncertain knowledge is produced. The expression "maybe ( )" is a format indicating the uncertain knowledge and means that the processing is required for confirming whether or not the contents described in ( ) are true or not. These uncertain knowledge means that the file "compo1" "may" exist in node 2, node 3, or node 4. For the object to be achieved by the plan produced using these uncertain knowledge, therefore, it is necessary to move the agent to node2, node3, or node4 for searching for the file or request other agents in node2, node3, or node4 to find the file.

The agent that is moved to another node in step 313 searches for the intended file "compo1" in the node, and as soon as the intended file is found, returns to the original node. Unless the intended file cannot be found in the node, the agent moves to still another candidate node and continues to search for the file.

Also, in the case where a contract net protocol (step 309) is used, an agent acting in other nodes is requested to transfer the intended file, for example. In this way, the contents described in the uncertain knowledge are realized and the plan is executed by the agent execution means 112L (step 305).

[2-5 Detail of Agent Movement]

Figure 8:
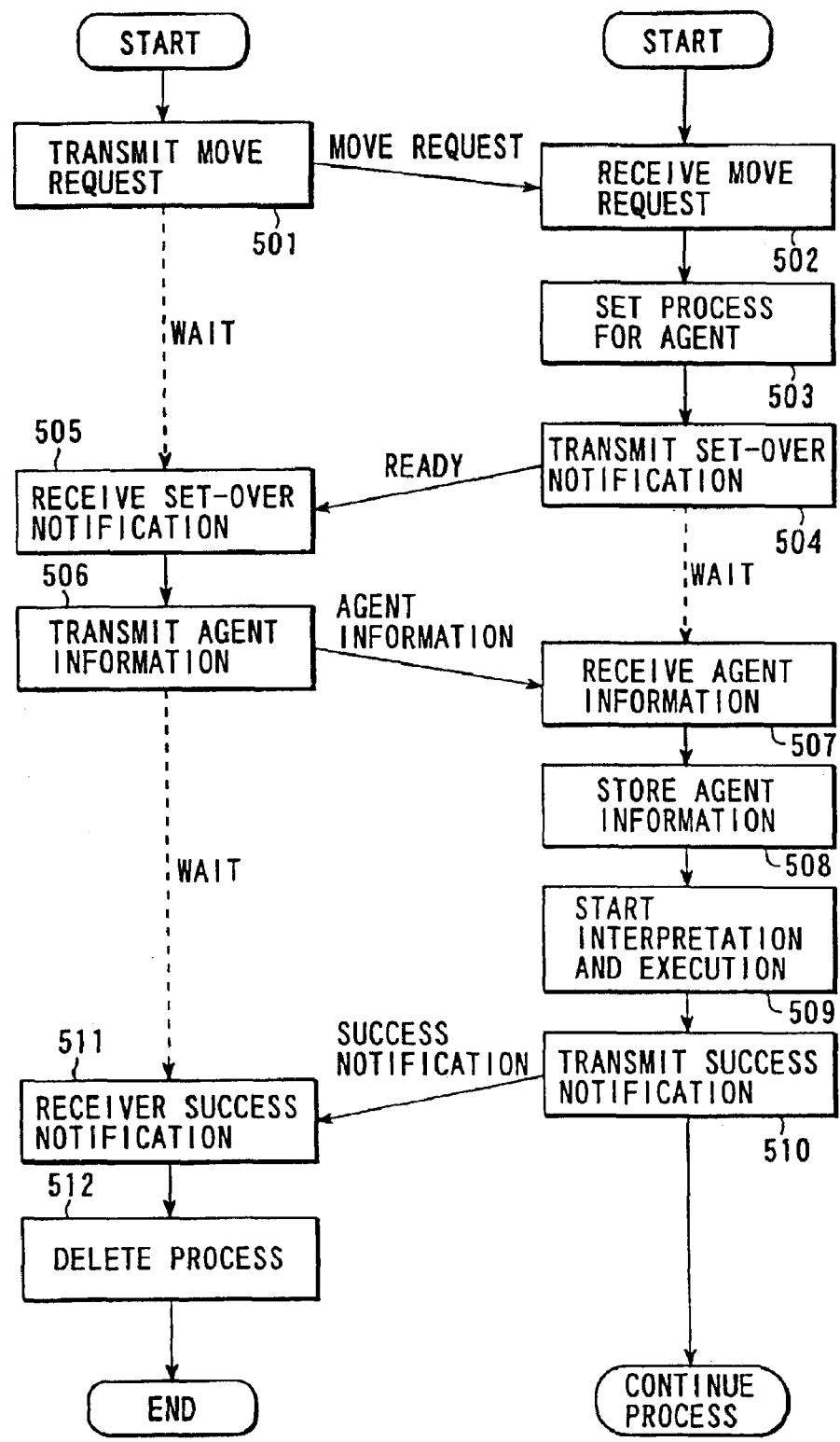
FIG. 8 is a flowchart showing a specific process for movement of an agent between nodes-according to an embodiment of the invention.

Now, the procedure for agent movement of step 313 shown in FIG. 4 will be described in detail. According to this embodiment, the agent movement is used in the case where the line reliability is low. A specific procedure for this agent movement is shown in the flowchart of FIG. 8. First in this procedure, the agent management means 104L of the local node 101L transmits an agent move request message to the agent management means 104R on the remote node (step 501).

The agent management means 104R on the remote node 101R, upon receipt of the agent move request (step 502), sets the process for the agent on its node, i.e. the remote node 101R (step 503), and transmits a set-over message to the agent management means 104L of the local node 101L (step 504).

The agent management means 104L of the local node 101L, upon receipt of the set-over message (step 505), reads the data on the plan and the internal state (hereinafter referred to as "the agent information") held by the agent from the agent storage means 102L and transmits it to the agent management means 104R of the remote node 101R (step 506).

The agent management means 104R of the remote node 101R, upon receipt of the agent information (step 507), stores the agent information in the agent storage means 102R of the remote node 101R (step 508), and starts interpretation and execution of the plan (step 509). After the agent management means 104R of the remote node 101R sends a success notification to the agent management means 104L of the local node 101L (step 510), the agent management means 104L of the local node 101L receives it (step 511), and erases the process of the agent before movement in step 512.

This movement is carried out according to the uncertain knowledge in the plan, so that the processing at the proper node is made possible without the user specifying a destination node in the request description.

[2-6 Contract net Protocol Procedure]

Now, the contract net protocol procedure of step 309 shown in FIG. 4 will be described in detail (reference: Smith, R. G., "The Contract Net Protocol: High-level Communication and Control in a Distributed Problem Solver", IEEE Trans. Computers, vol. 29, pp. 1104–1113, 1980.

Figure 9:
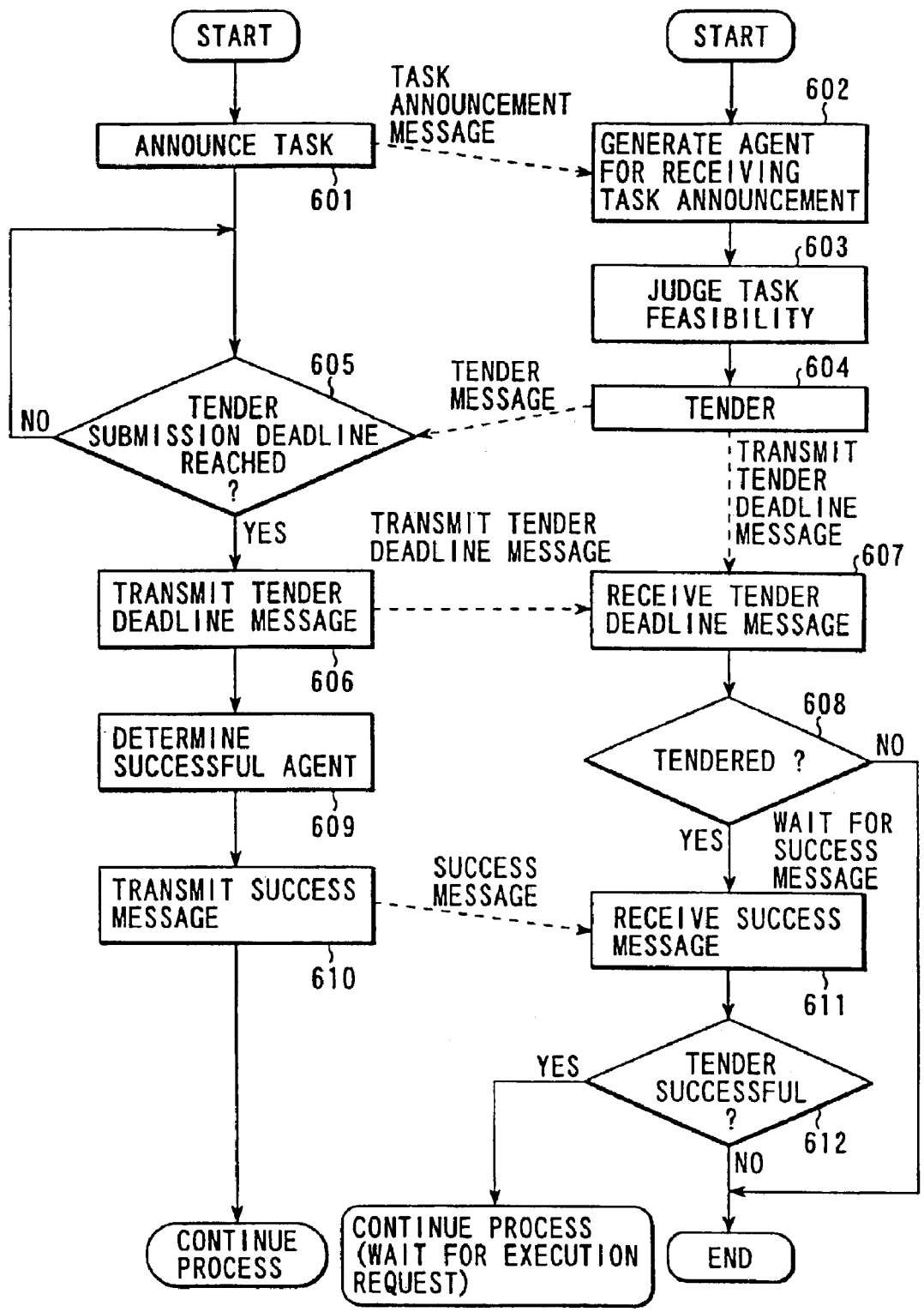
FIG. 9 is a flowchart showing a specific procedure for a contract net protocol according to an embodiment of the invention.
Figure 10:
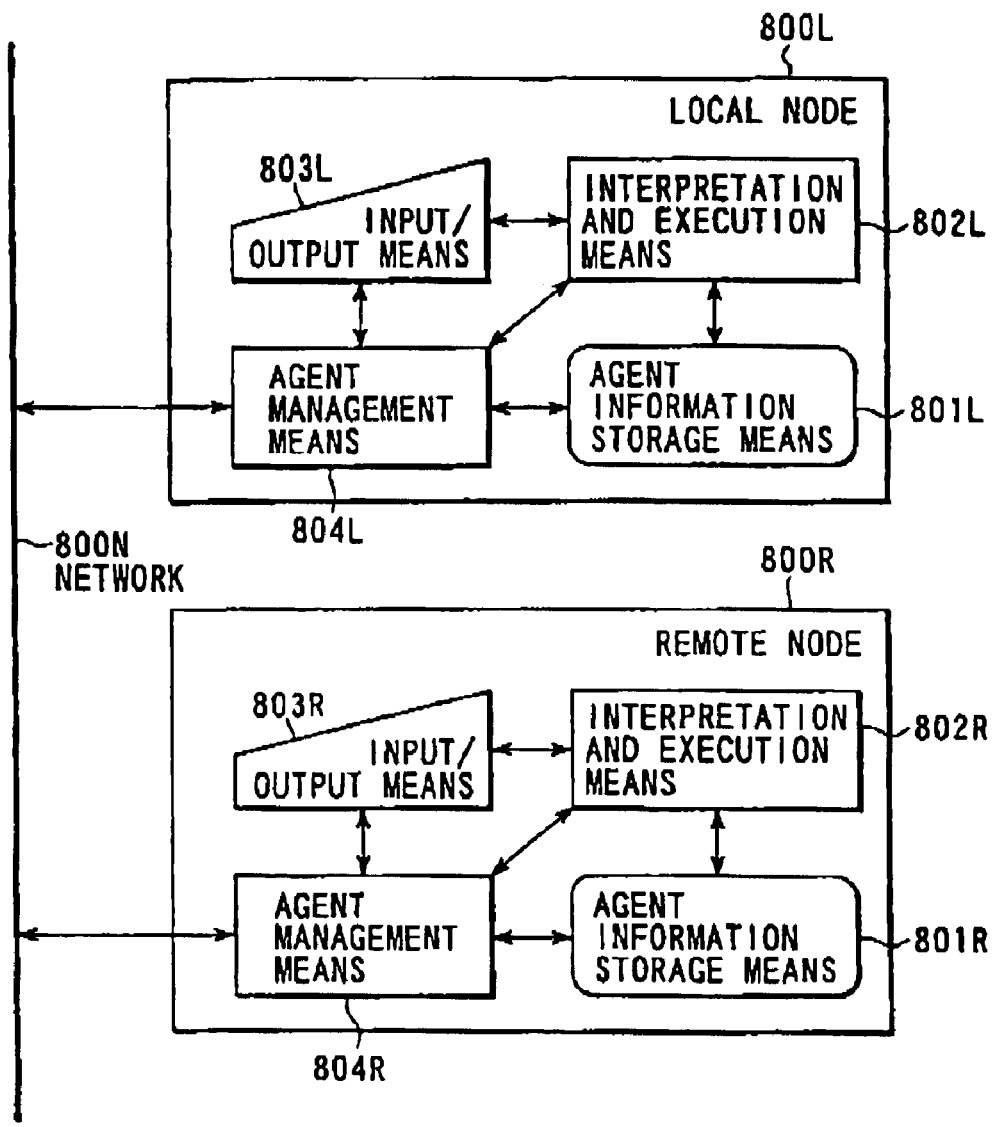
FIG. 10 is a block diagram showing a general configuration of the system for executing a remote programming according to the prior art.

According to this embodiment, the contract net protocol is used when the line reliability is high. The procedure for the contract net protocol is shown in detail in FIG. 9. The contract net protocol is for determining another agent to which a job is requested in the case where a task cannot be executed by an agent alone or in the case where if a task is requested to another agent, the operating efficiency of the system as a whole is improved.

The "task" is the job requested from an agent to other agents. According to this invention, the contract net protocol is used for assuring positive and efficient achievement of the contents representing the status which can be achieved if the uncertain knowledge is true. The contract net protocol between agents is established actually between cooperative protocol realization means 113 of the nodes in which the agents exist.

[2-6-1 Task Announcement]

In the case where a task execution is requested in the contract net protocol, the first step is for an agent having the task (hereinafter called "the task manager") to broadcast the information on the request (hereinafter referred to as "the task information") to the nodes to which the task is desirably requested. The broadcast is to transmit information randomly to parties existent within a predetermined range and the broadcasting of task information is called the task announcement.

An example of information broadcast is shown below.

Task ID: Task identifier

Task contents: Detailed description of the task requested, including a subgoal for planning, etc.

Task manager ID: Identifier of a task manager as an agent

Plan evaluation standard: A reference for comparing task execution plans in the case where there are a plurality of agents capable of executing a task, normally using the cost function.

Tender submission deadline: Closing time of tender submission described later. Normally, expressed by the time (in seconds, for example) elapsed from the task announcement.

Suppose the case of using the contract net since the following uncertain knowledge is used for achieving the subgoal "exists ("compo1")".

maybe (exists ("compo1") at node2)
maybe (exists ("compo1") at node3)

In this case, the following announcement is made.

Task ID: task1: user : field1 @ node1
Task contents: satisfy (exists ("compo1"))
Task manager ID: agent1: field1 @ node1
Plan evaluation standard: filesize ("compo1")
Tender submission deadline: 5

In this case, the task contents "satisfy (exists ("compo1"))" indicate the desire to satisfy the status in which the file "compo1" exists. Also, the item of "Task ID" expressly indicates a task announcement by the agent user of field1 of node1. Also, the item of "Plan evaluation standard" indicates that the file size of the file "compo1" to be acquired is used as a plan evaluation standard. The time point five seconds after the task announcement is designated as a tender submission deadline.

[2-6-2 Tender]

The node that has received the task information as described above generates an agent for each field and transfers the task information to them (step 602). Each agent that has received the task information judges whether or not the task can be executed in the field pertinent to it (step 603). In the case where the file "compo1" designated by the "task contents" described above exists in field1 of node2, for example, agent1 of field1 judges that the task contents can be executed. The agent capable of executing the task contents as described above transmits (tenders) the information on tender submission (hereinafter referred to as "the tender information") (submits a tender) to the task manager (step 604). The agent that has transmitted the tender information is called a tender agent. Also, the format of the tender information is illustrated below.

Task ID

Agent ID: His/her identifier (agent1: field1 @ node2, in this case)

Task execution plan evaluation: The evaluation of his/her task execution plan calculated according to the above-mentioned plan evaluation standard The task execution plan evaluation is the evaluation calculated by the tender agent for executing the task based on the plan evaluation standard indicated in the task announcement. In the example shown above, the plan evaluation standard indicated in the task announcement is "filesize ("compo1")". This indicates that in order to save the required storage capacity and the required transfer time, the agent capable of supplying a version file smaller in file size is a successful bidder as far as the same file "compo1" is involved. In such a case, the tender agent can calculate the plan evaluation standard "filesize ("compo1")" by reference to the data on the file "compo1" among the data held by him/her on various files.

Assume, for example, that agent1 generated in field1 of node2 has submitted a tender with an evaluation of "100" (in Kbytes). Also, assume that agent1 generated in field1 of node3 also judged that the task contents can be executed and has submitted a tender with the plan evaluation of 120. The agent that has judged that the task cannot be executed and failed to submit a tender reports the fact to the agent management means 104 generated by himself/herself and is deleted by the operation of the agent management means 104.

[2-6-3 Tender Submission Deadline and Successful Bid]

The task manager receives the tender information while comparing the tender submission deadline with the present time, and upon arrival at the tender submission deadline in step 605, transmits a message indicating the tender submission deadline in step 606. This deadline message is broadcast to all the requesting nodes to which the task information has been broadcast. The task manager then determines an agent who is a successful bidder in step 609. This determination is made by comparing the task execution plan evaluation of each tender information received before the tender submission deadline with the tender information of each agent based on a predetermined standard for determination. Assume, for example, that the standard for determination is such that an agent with a minimum numerical value of the plan evaluation is a successful bidder and that the tender information transmitted from the nodes are node2 filesize ("compo1")=100
node3 filesize ("compo1")=120.

Then, the task manager determines a successful bidder agent (called the successful agent) of node2 who submitted the best plan with a smaller plan cost.

This determination of a successful agent is equivalent to the determination of an agent as an actual request of the task. The timing at which the task is actually requested can be varied depending on the contents of the processing. Thus, the task may be requested immediately after the end of the contract net protocol or only after a predetermined timing.

Once a successful agent is determined, the task manager multicasts the tender information indicating the contents of the tender in step 610. In this case, the following tender information is multicast to each participating agent of node2 and node3.

Task ID

Successful agent ID: agent1: field1 @ node2, in this case

Upon receipt of this tender information, the successful agent waits for an actual request for execution of the task. Other agents who have failed in the tender report the fact to the agent management means 104 and are thereby deleted by the operation of the agent management means 104. The task manager subsequently requests the successful agent to execute the task of the tender, and the successful agent actually executes the contents of the task requested.

As described above, according to this embodiment, the contract net protocol is used for realizing the cooperation between agents. In the case where other nodes are requested of the processing by the contract net protocol, the balance is taken by tender between the conditions of the requesting node and the capacity of the accepting node. As a result, a superior processing efficiency is realized of the system as a whole.

[2-7 Information Exchange Between Agents]

In the case where a task is requested or otherwise a cooperative operation is performed between agents as described above, the whole system is desirably controlled in flexible way by a given agent controlling the behavior of the other agents. In an open network, for example, assume that a successful agent may fail to execute the task for some unexpected change of the situation. In such a case, the requesting agent (task manager), even while performing other processes, is required to perform such a process as following the tender procedure again as a measure against the failure.

As another example, assume that a given agent has requested some other agents to perform a task which consumes considerable system resources such as memories and processing time. Once the task execution becomes unnecessary for the situation change on the part of the requesting agent, the accepting agent is desirably required to suspend the work immediately.

In such a case, rapid processing of information is difficult by the conventional information exchange with the well-known blackboard in view of the fact that even when some information is written on the blackboard by the information source, the receiving party refers to the blackboard only after a series of work is complete.

According to this embodiment, each agent is controlled in flexible fashion by use of the hierarchical blackboard means 106 shown in FIG. 2 in the following manner. Specifically, assume that an agent 702 first writes a message to an agent 703 at a low hierarchical level for exchanging information on the normal operation on the blackboard means 106 shown in FIG. 2. The agent 703, after putting an end to a predetermined process, refers to the low hierarchical level on the blackboard means and finds and receives the message addressed to him/her.

In the case where an agent writes a message at a hierarchical level corresponding to the priority set for him/her, the message is processed in the same order of priority as normal operation. Even when the agent 702 writes a message at a low hierarchical level, therefore, the operation of the agent 703 can be neither affected nor interrupted until the agent 703 refers to the particular message.

In the case where the agent writes data at a hierarchical level higher than the one corresponding to the priority set for him/her, on the other hand, the normal operation of the other agents can be controlled or the job of the agents can be forcibly terminated by interruption. For example, assume the case where it is necessary to interrupt the normal operation of the agent 703 due to the change of the situation. The agent 702 writes a message 704 at a high hierarchical level (hereinafter referred to as "the high-level message") of the blackboard means 106. The normal processing by the agent 703 is processed in priority by the hierarchical blackboard management-means 107 and thus the normal processing by the agent 703 can be interrupted.

For an agent to write a message at a hierarchical level higher than the one corresponding to him/her, the hierarchical level to be written at is designated when the message is delivered to the hierarchical blackboard management means 107 or the hierarchical blackboard management means 107 is so configured that a message may be written at a high hierarchical level corresponding to the contents of the particular message. Also, in notifying a specific agent that the message is written at a high hierarchical level, the process of the operation being performed by the agent to which the message is addressed is interrupted in hardware or software fashion by the hierarchical blackboard management means 107, or all the agents make an inquiry to the hierarchical blackboard management means 107 at regular time intervals by a timer interrupt or the like thereby to check whether there is not any change at the high hierarchical level. Also, the hierarchical blackboard management means 107, as described later, is configured to monitor the hierarchical level designated by the agent receiving the notification. Then, the agent receiving the notification, without regard to the priority assigned to him/her, can receive the notification about the message from an agent of a desired priority. Thus, the cooperation between agents can be controlled in a greater variety of ways.

Even in the case where the agent of node2 whose tender was successfully accepted has failed to execute task1 of the tender, the task manager who requested the task can take a rapid countermeasure as far as the blackboard 106 means described below is used. (See FIG. 2)

By way of explanation, assume that the agent 703 who is a requesting task manager and the agent 702 who is a successful bidder have both the same order 0 of priority. Assume that the blackboard means 106 has hierarchical levels according to the order of priority and the information exchanged normally are written at the hierarchical level 0. In this case, the requesting agent 703, after determining the successful agent 702, requests the hierarchical blackboard management means 107 to monitor level 1 of the blackboard means 106 which is one level higher than the hierarchical level corresponding to his/her order of priority. In such a case, all that is required of the agent 703 who has requested the hierarchical blackboard management means 107 to monitor the hierarchical level 1 is to proceed with other job. Suppose that the agents 702, 703 correspond to level 1. In that case, a level higher by one, i.e. level 2 is used for controlling the execution.

In the case where the uncertain knowledge on which the task of the successful tender is based proves erroneous and the file "compo1" required for task execution is not existent in node2, then the successful agent 702 fails to execute the task. In such a case, the successful agent 702 requests the hierarchical blackboard management means 107 to write the ID of the particular task in the blackboard means 106. The hierarchical blackboard management means 107, to which the following data is delivered, is requested to write the task ID at a high hierarchical level.

bb_msg (1, failed (task1))

Specifically, "bb_msg( )" is a reserved word for requesting the write operation into the blackboard means 106. The first term "1" in the parenthesis indicates that level 1 which is one level higher than the order of priority of the successful agent 702 is to be written at on condition that the normal execution level is 0. The second term "failed (task1)" in the parenthesis is the contents to be written. The content "task1" is a task ID. In the case where distinction is required from data in other nodes or fields for the reason of system configuration or the like, the hierarchical blackboard management means 107 writes predetermined information including the node name as an addendum to the task ID. The hierarchical blackboard management means 107 which has received a request with such data writes information at level 1 as designated. An example of the information actually written at level 1 of the hierarchy is shown below.

failed (task1: agent1: field1: node2)

In this example, the agent name and the field name required for identification of the task ID are added. The hierarchical blackboard management means 107 which is requested to monitor the hierarchical level 1 immediately notifies the agent 703, a task manager, that the information is written at level 1.

The agent 703 that has received the notification requests agents other than the agent that has failed to execute the task to execute the task with a contract net protocol again, and thus determines an agent who executes the particular task in place of the unsuccessful agent.

As described above, according to this embodiment, the blackboard means 106 is configured hierarchically, so that the information written at higher levels of hierarchy are processed in priority over the information written at lower levels. As a result, the cooperative relation between agents can be controlled in flexible way by writing the information exchanged between agents at an appropriate hierarchical level in accordance with the significance thereof. Therefore, an unexpected situation change can be met easily. Also, even more detailed control is possible by use of a higher level of hierarchy for the information exchanged by agents higher in order of priority or by inputting/outputting information into or from the blackboard 106 in priority for higher hierarchical levels.

[2-8 Execution of Plan]

Upon completion of the movement of an agent (FIG. 4, step 313) or the processing for the uncertain knowledge by a contract net protocol (FIG. 4, step 309) as described above, the plan becomes substantially executable, the agent execution means 112 executes the plan (step 305). In the case where the execution ends unsuccessfully, however, there may be some problem existing in the processing for the uncertain knowledge. Thus, the plan is reviewed to check whether the uncertain knowledge has been used (step 310). If the uncertain knowledge is so used, the steps from the plan generation (step 303) are followed again (replanning). In other words, a replanning attempt is made to generate another plan different from the plan that has failed.

In the case where the plan execution fails in spite of the fact that the uncertain knowledge is not used for the plan (step 310), the knowledge or other parts of the system used for plan generation are considered to have a problem. The failure is thus notified to a high hierarchical level of the blackboard. Regardless of the final success or failure in execution, the agent execution is terminated at the time point when all the plans generated are executed.

[2-9 Effects]

As described above, according to this embodiment, a plurality of agents cooperate with each other using a standard inter-agent cooperation technique according to a contract net protocol generated by the cooperative protocol realization means 113 and blackboard means 106 thereby to efficiently utilize the information distributed over the network 100N. Also, the information on the change of the situation found for each node 101 are updated automatically or manually from time to time, and the plan defining the operation of each agent is prepared in accordance with the set object using the information thus updated. As a result, the operation of each agent changes with the environment and therefore a stable information processing is realized.

Further, in the processing for the uncertain knowledge, two types of techniques including the movement on the network and the inter-agent cooperation are effectively utilized appropriately. Specifically, in the case where the line for connecting to the network 100N the node which has generated a plan is low in reliability, the agent is moved to another node 101 to process the uncertain knowledge. This technique eliminates the need of frequent communication with the origin node during the processing of the uncertain knowledge, and therefore a stable operation is realized in spite of a low line reliability.

In the case where the line reliability is high, on the other hand, an inter-agent cooperation is used by requesting the agent of other nodes to authenticate the processing of the uncertain knowledge. In this technique, the series of processing for movement of the agent is not required, and therefore the uncertain knowledge can be processed with rapidity. By using these two types of techniques appropriately in accordance with the line reliability in this way, quick authentication is possible when the line reliability is high while the information can be processed stably even when the line reliability is low. Especially, even in the case where the network is encountered with the two problems of low line reliability and unstable environment at the same time, an efficient stable information processing is realized by separate use and combination of the above-mentioned techniques for plan generation and authentication.

Further, according to this embodiment, each agent operates in a different field according to the object thereof, and generates a plan using only the knowledge associated with the object. As a result, the duplication of operation area between agents is easily avoided. Also, the fact that reference to extraneous knowledge is not required in searching for the plan generation knowledge improves the efficiency of plan generation.

3. Other Embodiments

The present invention is not limited to the above-mentioned embodiments, but includes other embodiments illustrated below. For example, the nodes, which are all configured the same way in the above-mentioned embodiments, can be differently configured from each other, and only some of the nodes may be divided into fields. Also, the blackboard means and the hierarchical blackboard management means may not be provided for each node but a single blackboard means and a single hierarchical blackboard management means may be provided in the network or for each field in the node. In the case where the blackboard means and the hierarchical blackboard management means are provided for each node, mutual exchange of information is possible between the agents of the nodes by referring to the blackboards of nodes of each other. In such a case, even if a fault develops in some of the nodes, the effect on the whole system is minimized in view of the fact that the information to be exchanged is distributed among the nodes. In the case where a single blackboard means and a single hierarchical blackboard management means are provided, on the other hand, the objects accessed by the agents for information exchange are unified and therefore the information can be exchanged more efficiently. Also, in the case where the blackboard means and the hierarchical blackboard management means are provided for each field, the information to be exchanged, i.e. the risk is distributed more extensively for an improved fault protection of the system.

The provision of the hierarchically-structured blackboard means or the hierarchical blackboard management means or the use of the contract net protocol for cooperation between agents is not essential.

The communication between agents can be accomplished directly without using the blackboard means 106 and the hierarchical blackboard management means 107. The direct communication is realized in the following manner, for example. Specifically, an agent, who is desirous of sending data directly to another agent, designates the destination agent and delivers the data to the agent management means 104 (FIG. 1). The agent management means 104 transfers the data to the node having the destination agent using the communication function of the network 100N through a platform 110. The agent management means 104 of the node which has received the transferred data delivers the data to the destination agent.

This direct information exchange can be used in place of or in parallel with the indirect information exchange using the blackboard. As a result, the variety of the means for information exchange can be increased, thereby making it possible to realize the inter-agent cooperation more flexibly. For example, the communication which is significant only between two given agents but not involving other agents can be carried out directly but not through the blackboard. Also, the blackboard of a large capacity need not be prepared for receipt or delivery of a large file between agents. The blackboard capacity can thus be reduced. Further, since selected one of the communication through the blackboard and the direct communication can be used as desired according to the object of the communication, the processing efficiency is improved. The function of direct information exchange can be provided to the cooperation protocol realization means 113 instead of to the agent management means 104 or can be realized by another new means.

The present invention is generally considered realizable by an information processing program for realizing the functions thereof. A recording medium for recording such a program is also included in an aspect of the invention.

As described above, according to the present invention, a plurality of agents cooperate in such a manner that any change of the situation is reflected in the operation of the agents and the two types of techniques are used separately from each other according to the line reliability for the processing relating to the uncertain knowledge. Thus information can be processed in stable fashion even in the case where the situation changes unexpectedly or a line low in reliability exists.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An agent system in which a plurality of agents operate over a distributed node network, comprising:

a platform on one node of the network, on which a plurality of fields of activity and a set of knowledge that are divided into a plurality of knowledge of subsets are provided;

an agent generation unit configured to generate an agent in response to a request;

a planning unit configured to generate a plan that satisfies the request for the agent;

a determination unit configured to determine a reliability of a communication line when an uncertain knowledge is used to generate the plan by the planning unit, wherein the uncertain knowledge is processed by other nodes;

a selection unit configured to select one of a processing of a movement of the agent and a processing based on a contract net protocol in accordance with the reliability;

an execution unit configured to execute the plan after the processing of the uncertain knowledge by the other nodes; and a field management unit configured to manage the plurality of fields of activity wherein the field management unit assigns one of the plurality of fields of activity to the agent, and assigns one of the plurality of knowledge subsets used for generating the plan by the planning unit, to the agent.

2. The system according to claim 1, further comprising:
a plurality of blackboard systems associated with the plurality of fields of activity.

3. The system according to claim 1, wherein a first field of activity in which a first agent operates is independent of a second field of activity in which a second agent operates preventing the first agent from interfering with the second agent.

4. A method of managing a plurality of agents that operate over a distributed node network in an agent system, wherein a node of the network includes a platform on which a plurality of fields of activity and a set of knowledge divided into a plurality of knowledge subsets are provided, the method comprising:

generating an agent in response to a request;

assigning one of the plurality of fields of activity to the agent;

assigning one of the plurality of knowledge subsets to the agent; and generating a plan that satisfies the request for the agent by using one of the assigned knowledge subsets;

determining a reliability of a communication line when an uncertain knowledge is used to generate the plan, wherein the uncertain knowledge is processed by other nodes;

selecting one of a processing of a movement of the agent and a processing based on a contract net protocol in accordance with the reliability;

executing the plan after the processing of the uncertain knowledge by the other nodes.

5. A method according to claim 4, further comprising;

associating the plurality of fields of activity with a plurality of blackboard systems.

6. The method according to claim 4, wherein a first field of activity in which a first agent operates is independent of a second field of activity in which a second agent operates preventing the first agent from interfering with the second agent.

7. An information processing apparatus that serves as a node in an agent system, which is connected to a distributed node network in which a plurality of agents operate, comprising:

a platform on which a plurality of fields of activity and a set of knowledge divided into a plurality of knowledge subsets are provided;

an agent generation unit configured to generate an agent in response to a request;

a planning unit configured to generate a plan that satisfies the request for the agent;

a determination unit configured to determine a reliability of a communication line when an uncertain knowledge is used to generate the plan by the planning unit, wherein the uncertain knowledge is processed by other nodes than the information processing apparatus;

a selecting unit configured to select one of a processing of a movement of the agent and a processing based on a contract net protocol in accordance with the reliability;

an execution unit configured to execute the plan after the processing of the uncertain knowledge by the other nodes; and a field management unit configured to manage the plurality of fields of activity, wherein the field management unit assigns one of the plurality of fields of activity to the agent, and assigns one of the plurality of knowledge subsets used for generating the plan by the planning unit to the agent.

8. The apparatus according to claim 7, further comprising:
a plurality of blackboard systems associated with the plurality of fields of activity.

9. The apparatus according to claim 7, wherein a first field of activity in which a first agent operates is independent of a second field of activity in which a second agent operates preventing the first agent from interfering with the second agent.

* * * * *

UNITED STATES PATENT AND TRADEMARK OFFICE
CERTIFICATE OF CORRECTION

PATENT NO. : 6,925,486 B2
DATED : August 2, 2005
INVENTOR(S) : Hattori et al.

It is certified that error appears in the above-identified patent and that said Letters Patent is hereby corrected as shown below:

Title page,
Item [45], Date of Patent, change "Aug. 2, 2005" to -- **\*Aug 2, 2005** --.
Item [\*] Notice, insert the following:
-- This patent is subject to a terminal disclaimer. --.

Signed and Sealed this

Eighth Day of November, 2005

JON W. DUDAS
*Director of the United States Patent and Trademark Office*